United States Patent
Scavetta et al.

(10) Patent No.: US 11,360,046 B2
(45) Date of Patent: Jun. 14, 2022

(54) ORGANIC ELECTROCHEMICAL TRANSISTOR BASED ON CONDUCTIVE POLYMER AND AG, AGX (X = CL, I, BR) HALIDE NANOPARTICLES, AS CHEMICAL SENSOR

(71) Applicant: Alma Mater Studiorum—Universita' Di Bologna, Bologna (IT)

(72) Inventors: Erika Scavetta, Bologna (IT); Beatrice Fraboni, Bologna (IT); Isacco Gualandi, Bologna (IT)

(73) Assignee: ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 259 days.

(21) Appl. No.: 16/612,067

(22) PCT Filed: Apr. 23, 2018

(86) PCT No.: PCT/IT2018/050069
§ 371 (c)(1),
(2) Date: Nov. 8, 2019

(87) PCT Pub. No.: WO2018/207220
PCT Pub. Date: Nov. 15, 2018

(65) Prior Publication Data
US 2020/0096475 A1 Mar. 26, 2020

(30) Foreign Application Priority Data
May 9, 2017 (IT) .......................... 102017000049746

(51) Int. Cl.
*G01N 27/414* (2006.01)

(52) U.S. Cl.
CPC .................. *G01N 27/4146* (2013.01)

(58) Field of Classification Search
None
See application file for complete search history.

(56) References Cited

U.S. PATENT DOCUMENTS

2008/0187651 A1 8/2008 Lee et al.

FOREIGN PATENT DOCUMENTS

EP 3795990 A1 * 3/2021 ......... G01N 27/4146

OTHER PUBLICATIONS

Tarabella et al; Effect of the gate electrode on the response of organic electrochemical transistors; Applied Physics Letters, A I P Publishing LLC, US, vol. 97; dated Sep. 22, 2010; p. 123304-1-123304-3.

(Continued)

*Primary Examiner* — J. Christopher Ball
(74) *Attorney, Agent, or Firm* — Knobbe Martens Olson & Bear LLP

(57) ABSTRACT

The present invention relates to an organic electrochemical transistor based on conducting polymers (for example PEDOT:PSS) in which the gate electrode has been integrated on the surface of the channel through the deposition of Ag halide nanoparticles, AgX (X=Cl, Br, I). This configuration allows the device to operate without applying a potential difference to the gate electrode (with consequent reduction in operating costs). The device is able to detect the halide ion: by varying the nature of the nanoparticles and in particular by using AgX (X=Cl, Br, I) or Ag2S the sensor acquires sensitivity towards anion X or sulfide.

14 Claims, 7 Drawing Sheets

(56) References Cited

OTHER PUBLICATIONS

Mattana et al; Organic electronics on natural cotton fibres; Organic Electronics, vol. 12, Sep. 2011; pp. 2033-2039.
Gualandi et al; Textile Organic Electrochemical Transistors as a Platform for Wearable Biosensors; Scientific Reports; Sep. 26, 2016; pp. 1-10.
Spanu et al; An organic transistor-based system for reference-less electrophysiological monitoring of excitable cells; Scientific Reports; Mar. 6, 2015; p. 1-7.
Maccioni et al; Towards the textile transistor: Assembly and characterization of an organic field effect transistor with a cylindrical geometry; Applied Physics Letters, A I P Publishing LLC, US, vol. 89, Oct. 5, 2006; p. 143515-1-143515-3.
Lin et al; Electrochemical synthesis of poly(3,4-ethylenedioxythiophene) doped with gold nanoparticles, and its application to nitrite sensing; Mikrochimica ACTA, Springer Verlag,; Jan. 27, 2016; pp. 1235-1241.
Wang et al; investigation of Ag-poly (3,4-ethylenedioxythiophene): polystyrene sulfonate nanocomposite films prepared by a one-step aqueous method; Journal of Applied Physics, vol. 109, Jun. 17, 2011; pp. 124902-1-124902-4.
Kang et al; Detection of halide ions with AlGan/ GaN high electron mobility transistors; Applied Physics Letters, vol. 86, Apr. 18, 2005; p. 173502-1-173502-3.
International Search Report and Written Opinion; PCT/IT2018/050069; dated Aug. 28, 2018; 14 pages.
Search Report and Written Opinion; IT201700049746; dated Mar. 1, 2018 ; 9 pages.

\* cited by examiner

ORGANIC ELECTROCHEMICAL TRANSISTOR BASED ON CONDUCTIVE POLYMER AND AG, AGX (X = CL, I, BR) HALIDE NANOPARTICLES, AS CHEMICAL SENSOR

The present invention relates to an organic electrochemical transistor based on conductive polymer and nanoparticles (NPs) of Ag, AgX (X=Cl, I, Br) halide as a chemical sensor.

More specifically, the present invention relates to an organic electrochemical transistor based on conducting polymers (for example PEDOT:PSS), wherein the gate electrode has been integrated on the surface of the channel through the deposition of Ag halide nanoparticles, AgX (X=Cl, Br, I). This configuration allows the device to operate without applying a potential difference to the gate electrode (with the consequent reduction in complexity and operating costs). The device is capable of detecting the halide ion: by varying the nature of the nanoparticles and in particular by using AgX (X=Cl, Br, I) or $Ag_2S$ the sensor acquires sensitivity towards X anion or sulfide.

STATE OF THE ART

The organic electrochemical transistor (OECT) was proposed in the early '80s by Wrighton et al., [White H S, Kittlesen G P, Wrighton M S (1984) Chemical derivatization of an array of three gold microelectrodes with polypyrrole: fabrication of a molecule-based transistor. J. Am. Chem. Soc. 106 (18): 5375-5377].

Referring to FIG. 1, an OECT consists of a three-terminal device, in which two electrodes (source and drain) are connected by a conductive polymer (usually polypyrrole, polyanailine or PEDOT:PSS) which constitutes the transistor channel and is in contact with an electrolyte. The third electrode (gate electrode), also immersed in the electrolyte, controls the doping level, and hence the conductivity, of the conducting polymer. The operation of an OECT can be described in the following way [Steady-State and Transient Behavior of Organic Electrochemical Transistors, Daniel A. Bernards and George G. Malliaras Advanced Funct. Mater. 2007, 17, 3538-3544]: by convention, the source electrode is connected to the ground and a potential is applied to the gate electrode (Vg) relative to the earth. The current flowing in the channel (Isd) can be measured as a function of the potential applied to the gate electrode (Vg). Applying a positive Vg introduces ions from the electrolyte into the conducting polymer and this causes the decrease of the Isd current.

An OECT can function as a chemical sensor when the analyte acts in the electrochemical processes that control the doping of the conducting polymer, by modifying Isd.

Several OECTs have been developed, all having a metal gate electrode, sensitive to different chemical compounds such as: cations [RB Dabke, G D Singh, A. Dhanabalan, R. Lal and A Q Contractor, Anal. Chem., 1997, 69, 724; P. Lin, F. Yan and H L W Chan, A C S Appl. Mater. Interfaces, 2010, 2, 1637-1641] and bioanalytes [Patent US20150115227A1], dopamine [H. Tang, P. Lin, H L W Chan and F. Yan, Biosens. Bioectron, 2001, 26, 4559-4563; S. Casalini, F. Leonardi, T. Cramer and F. Biscarini, Org. Electron, 2013, 14, 156-163], adrenaline [N. Coppede', G. Tarabella, M. Villani, D. Calestani, S. lannotta and A. Zappettini, J. Mater. Chem. B, 2014, 2, 5620-5626] and glucose [J. Liao, S. Lin, Y. Yang, K. Liu and W. Du, Sens. Actuators, B, 2015, 208, 457-463; D T Hoa, T N S Kumar, N S Punekar, R S Srinivasa, R. Lal and A Q Contractor, Anal. Chem., 1992, 64, 2645-2646; P N Bartlett and P R Birkin, Anal. Chem., 1993, 65, 1118-1119; D A Bernards, D J Macaya, M. Nikolou, J A DeFranco, S. Takamatsu and G G Malliaras, J. Mater. Chem., 2008, 18].

The inventors have already demonstrated the possibility of realizing an entirely OECT (source, drain and gate and channel electrodes) built in PEDOT:PSS. The device was made by depositing the electrodes by spin coating in the form of thin films, on a glass support and was used as a chemical sensor for ascorbic acid determination [A simple all-PEDOT:PSS electrochemical transistor for ascorbic acid sensing, I Gualandi, M. Marzocchi, E. Scavetta, M. Calienni, A. Bonfiglio and B. Fraboni, J. Mater. Chem. B, 2015, 3, 6753-6762]. Furthermore, it has been demonstrated the possibility of making the device on a textile substrate, by depositing the gate, source and drain electrodes on a textile by spin coating: the device thus produced is able to operate as a chemical sensor also in human biological fluids. The main disadvantages of this device are the need for a gate electrode connected to the reading electronics and the need to place an electrolyte between the gate electrode and the channel which maintains a constant electrical conductivity. [Textile Organic Electrochemical Transistors as a Platform for Wearable Biosensors, I. Gualandi, M. Marzocchi, A. Achilli, D. Cavedale, A. Bonfiglio & B. Fraboni, Scientific Reports 33637 (2016)].

Chloride analysis can be alternatively carried out with: potentiometric methods, volumetric methods (titrations), ion chromatography. However, all known methods suffer of problems that limit their applicability for low cost online analysis and are listed below:
- volumetric methods: they require the use of high sample quantities, requiring the addition of reagents and equipments that are not suitable for miniaturization or online analysis;
- chromatographic methods: high cost and use of non-miniaturized instruments; they require high amounts of solvent to work.
- potentiometric methods: ion-selective electrodes: the measurement requires two electrodes, the ion-sensitive chloride electrode and a reference electrode; the cost is not high but is nevertheless significant; there is also a difficulty of miniaturization due to the required presence of a reference electrode.

Purpose and Object of the Invention

The object of the present invention is to provide an organic electrochemical transistor based on conductive polymer and nanoparticles, which solves the problems and overcomes the drawbacks of the prior art.

An object of the present invention is a transistor according to the appended claims.

DETAILED DESCRIPTION OF EMBODIMENT OF THE INVENTION

List of Figures

The invention will be now described for illustrative but not limitative purposes, with particular reference to the drawings of the attached figures, in which.

It is here specified that elements of different embodiments may be combined together to provide further embodiments without limits, respecting the technical concept of the invention, as the average skilled person of the art intends without problems from what has been described.

The present description also refers to the prior art for its implementation, with regard to the characteristics of detail not described, such as elements of minor importance usually used in the prior art in solutions of the same type.

When an element is introduced, it always means that it can be "at least one" or "one or more".

When list of elements or features is listed in this description it is meant that the invention according to the invention "comprises" or alternatively "is composed of" such elements.

EMBODIMENTS

In order to simplify the OECT structure our invention integrates the gate electrode into the conducting polymer channel through the insertion of electrochemical deposited Ag/AgCl nanoparticles. In this way the device is capable of working even without the gate electrode since the variation of the electrochemical potential of the Ag/AgCl modifies the electrochemical potential of the PEDOT:PSS by varying the conductivity. The device is sensitive to the concentration of chlorides.

In one embodiment, the sensor according to the invention is based on a composite material consisting of a conductive polymer (PEDOT:PSS) and Ag/AgCl nanoparticles in which the Ag is the innermost core of the material, while the AgCl covers the particle, which can operate as a sensor for determining the chloride ion. The Ag/AgCl nanoparticles play the same role of the gate electrode in an organic-based electrochemical transistor and, through electrochemical reactions, they can control the current flowing in the polymer.

The basic concept of the invention can also be applied to the development of sensors, which allow the determination of anions which form insoluble salts with the Ag, such as for example $Br^-$, $I^-$ and $S^{2-}$. The PEDOT:PSS film is deposited on the surface of a suitable substrate (e.g. glass or plastic material) through spin coating (e.g. deposited by setting a rotation of 500 rpm for 10 s) and two collectors are obtained for example by applying a silver based conductive paint at the ends of the conductive material strip (FIG. 2).

Figure 1:
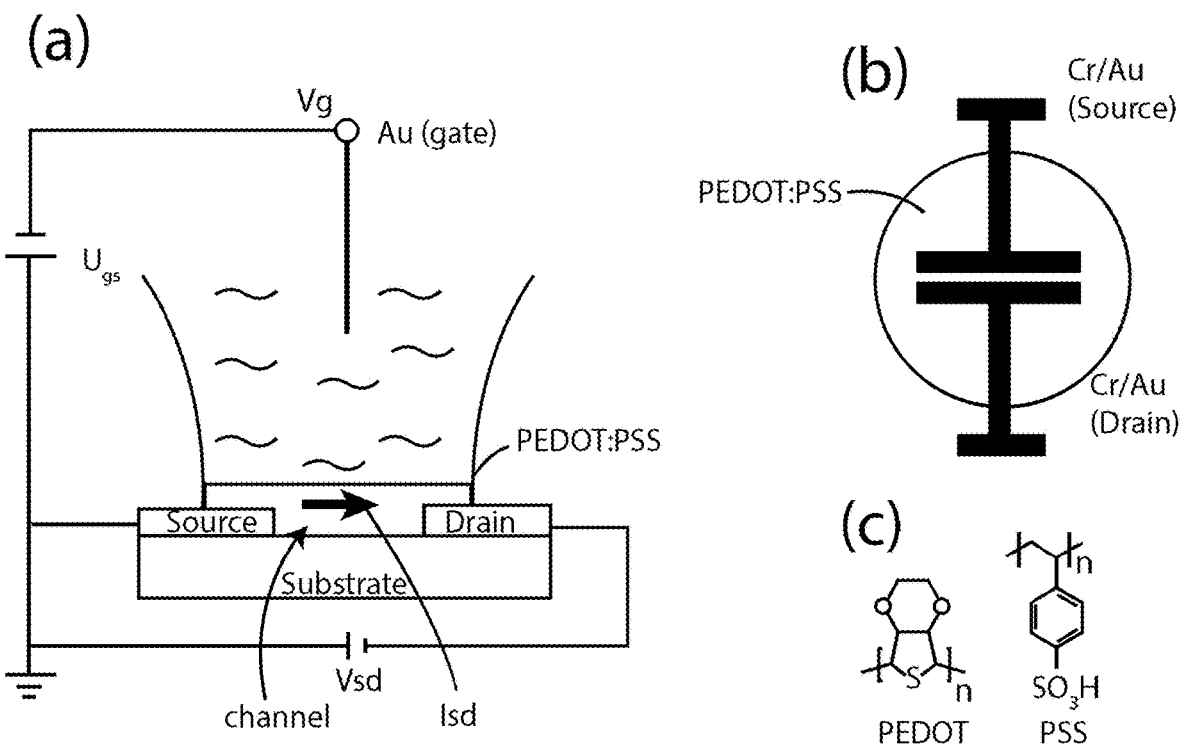
FIG. 1 shows a scheme of a transistor for electrochemical use according to the prior art.
Figure 2:
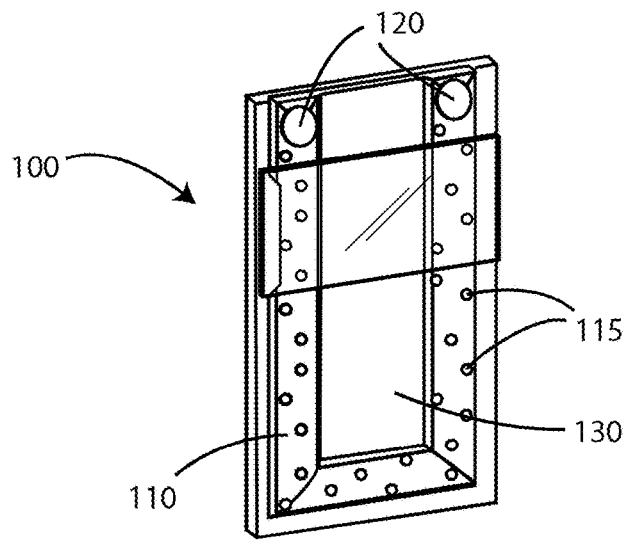
FIG. 2 shows a scheme of an embodiment of the device according to the invention, in which the traces of PEDOT:PSS (darker strip) are deposited on a glass or plastic support.
Figure 4:
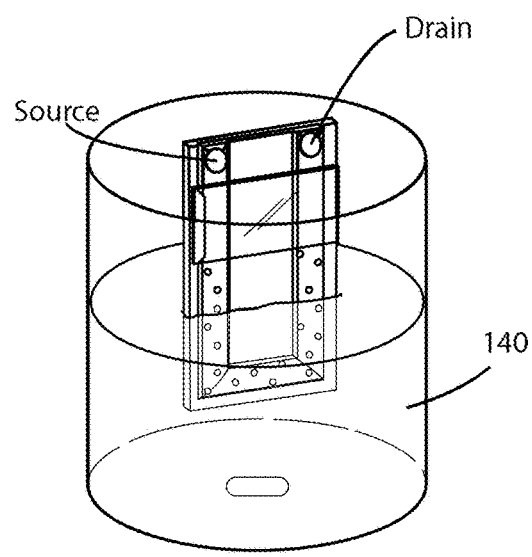
FIG. 4 shows a diagram of an experimental apparatus used for determining the concentration of chloride ions with a prototype device according to the invention.

An example of device 100 is shown in FIG. 2 and in FIG. 4. A PEDOT:PSS film 110 (for example U-shaped) is deposited on a substrate 130 (e.g. glass). The deposition of the nanoparticles of Ag 115 on the PEDOT:PSS 110 to form the composite material takes place in two phases. During the first phase, the PEDOT:PSS film 110 is immersed in a solution containing $Ag^+$ and, through the application of a cathodic potential, the deposition of Ag 115 nanoparticles takes place. Subsequently, the formation of AgCl is induced in solution containing chlorides applying an anode potential to the PEDOT:PSS film modified with Ag nanoparticles.

Metal collectors 120 are provided at the ends of the U formed constituted of PEDOT:PSS. Optionally, a container 140 is fixed to the support 130 and it will contain the electrolyte to be analyzed.

Figure 3:
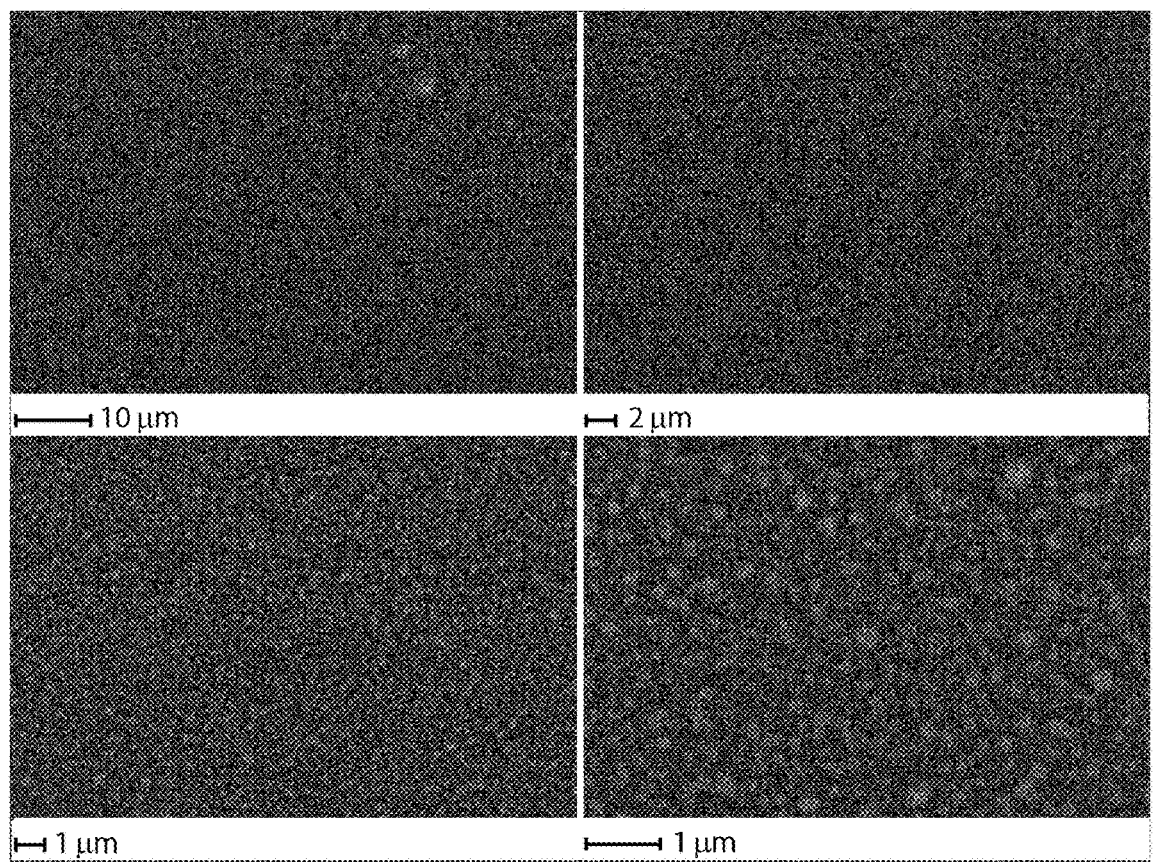
FIG. 3 shows a SEM (Scanning Electron Microscope) characterization of the surface of a sensor prototype according to the invention, in which the AgCl particles deposited on PEDOT:PSS are observed.

FIG. 3 shows the image of the surface of the material, obtained by electron microscopy, in which it is possible to see the Ag/AgCl nanoparticles deposited on the surface of the PEDOT:PSS.

Figure 5:
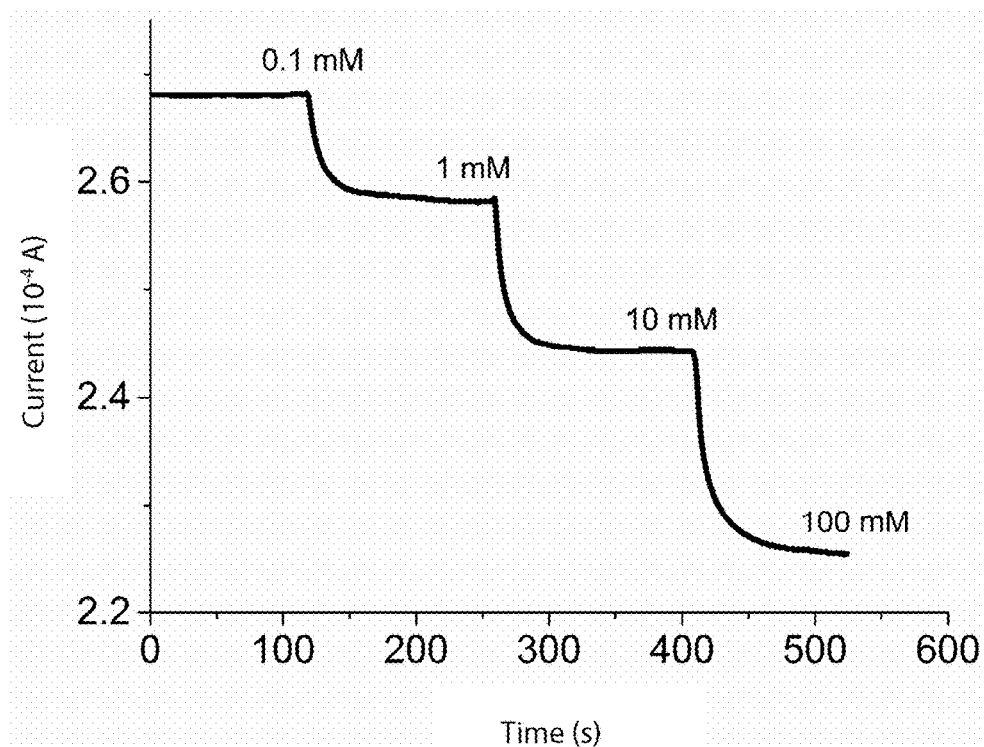
FIG. 5 shows a response of a sensor prototype according to the invention at various concentrations of $Cl^-$ in $KNO_3$ 0.1 M solution. A current drop proportional to the chloride concentration is observed.
Figure 6:
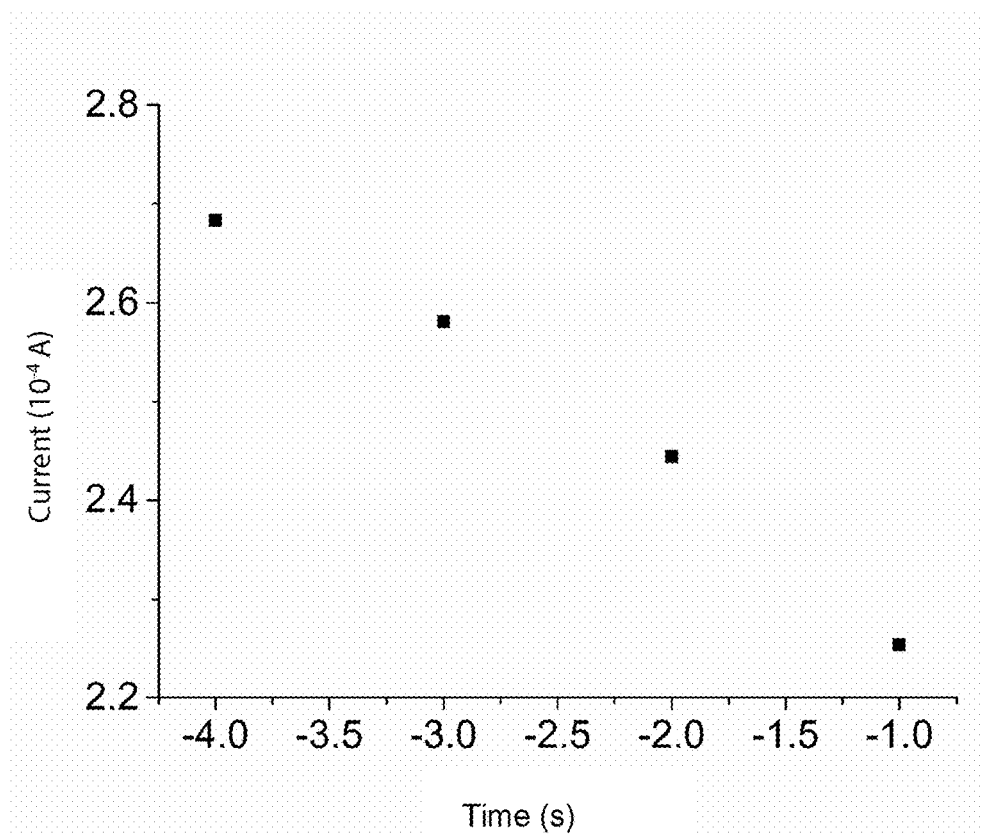
FIG. 6 shows a calibration curve of a chloride ion sensor, according to the invention.

The chloride ion concentration is determined by placing the sensor in contact with the liquid sample to be analyzed and applying a potential (−1.0 V<V<1.0V) between the source and the drain while the current flowing to the two terminals is measured. The experimental apparatus is shown in FIG. 4. The progressive additions of $Cl^-$ ions in the solution to be analyzed lead to an increase in their concentration, which is detected by the sensor with a decrease in the current flowing between the source and the drain in the shape of a step, as shown in FIG. 5. FIG. 6 shows the calibration of the sensor, wherein it is evident that the measured current is linearly proportional to the logarithm of the concentration of chloride ions in the solution. The inventors have finally shown that the sensor according to the invention can work in a matrix that simulates human sweat, prepared according to ISO 105-E04-2008E, without however adding the analyte of interest, since its concentration will be varied during the calibration phase. The experiments carried out show that also in this case the concentration increase of chloride ions leads to a decrease in the drain current as reported in FIG. 7.

Using procedures similar to those used for the chloride ion sensor development it was possible to develop sensors for bromide and iodide ions.

The thickness of the substrates (either rigid or plastic or flexible) is not relevant. Preferably, it ranges from 15 micrometers to several millimeters.

The amount of deposited nanoparticles was evaluated for various deposition conditions by estimating both the amount of silver on the conductive polymer surface and the number of particles. The amount of silver was evaluated through an anodic stripping voltammetry and appears to be within the range of $1\times10^{-8}$ mol cm$^{-2}$ and $1\times10^{-6}$ mol cm$^{-2}$. The number of deposited nanoparticles was evaluated with atomic force microscopy and was found to vary between 1 and 100 $\mu$m$^{-2}$ particles, depending on the deposition conditions. Several devices prepared by varying the amount of Ag and the number of particles in the above ranges show a very similar sensitivity, indicating that in such intervals the amount of deposited nanoparticles does not affect the analytical performance of the sensor. These considerations apply to all the analytes considered.

Planar Configuration with Gold Electrodes

Figure 13:
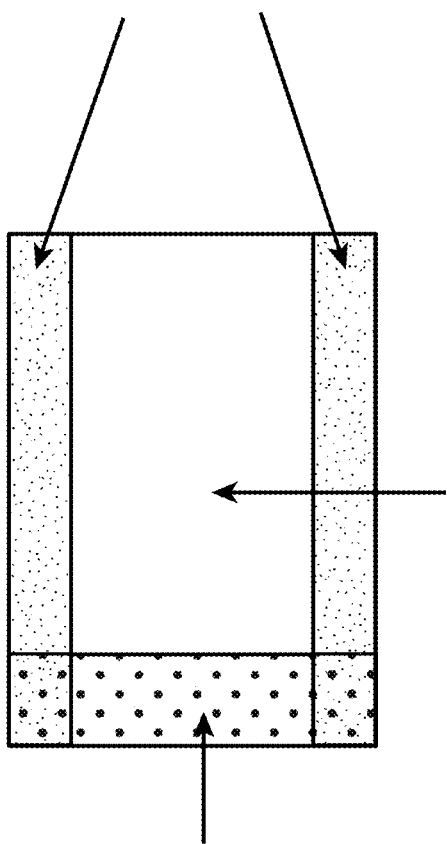
FIG. 13 shows a scheme of a different embodiment of the transistor according to the invention.

Referring to FIG. 13, this configuration presents the highest analytical sensitivity and operational stability, however the preparation of the device requires various deposition processes, even at high temperature.

Configuration on Cotton Thread

Figure 12:
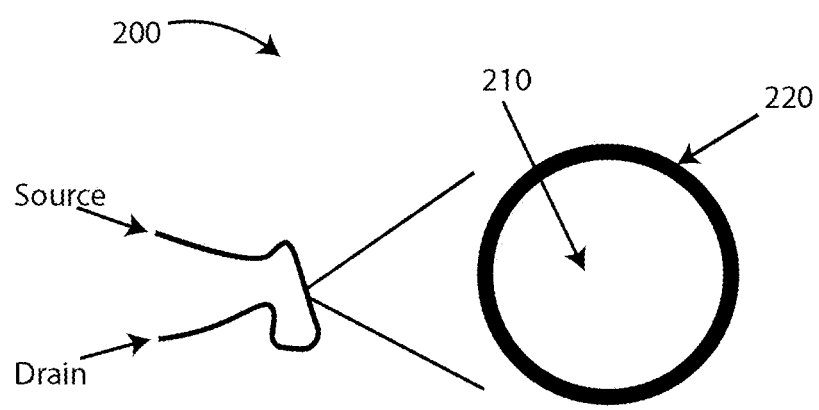
FIG. 12 shows a scheme of a further embodiment of the transistor according to the invention.

Referring to FIG. 12, a configuration 200 on cotton thread 210 or other synthetic textile material (wool, silk, nylon) or any other wire-shaped substrate with a circular or triangular cross-section, etc., is possible.

The PEDOT:PSS 220 is deposited on wire 210, whose ends constitute the drain and source electrodes. The PEDOT:PSS is derivatized with nanoparticles as above.

The fabric configuration is particularly suited to the development of wearable sensors.

Physical Principle on which the Invention is Based

An organic-based electrochemical transistor (OECT) consists of a conductive polymer strip, the channel, and a gate electrode, both immersed in an electrolyte solution. In an OECT, the application of a positive potential to the gate electrode causes the injection of cations into the organic semiconductor, which constitutes the channel. The injected positive charges cause the de-doping of the polymer and therefore a decrease in the concentration of the charge carriers, which is observed through a drop in the drain current in the transistor. In case of a negative potential is applied to the gate electrode, inverse processes takes place. When an OECT is used in a faradic regimen, reactions of electrochemical nature modify the action of the gate electrode on the conductivity of the channel and therefore lead to record a different electric current flowing between source and drain. This process is the basis for the operation of an OECT as a chemical sensor for molecules that can undergo redox processes. Unfortunately, many electrochemical reactions are not spontaneous and therefore to take place they require the application of a potential to the gate electrode. However, some reactions, among which the reactions of oxide reduction of silver in the presence of an anion, which can form an insoluble salt, can spontaneously take place and in a highly controlled way even without the application of an external potential to the gate electrode. In this way, the material on which these reactions take place (silver coated with silver chloride) can be incorporated into the conducting polymer, so as to integrate the functionality of the gate electrode into the channel and therefore there is no longer need of a third electric terminal.

The device works thanks to the electrochemical equilibrium between silver and silver chloride, both contained in the nanoparticles, which triggers the following electrochemical reaction:

The electrochemical potential of the reaction is controlled by the concentration of Cl$^-$ through the Nerst equation written for the system under examination:

$$E = E^0 - \frac{RT}{nF}\ln Cl^-$$

Since the Ag/AgCl nano particles are in electrical contact with the PEDOT:PSS, the variation of their electrochemical potential stimulates oxidation reduction reactions in the conducting polymer, which lead to the variation of the doping degree of the polymer itself and therefore of its conductivity. Different concentrations of Cl$^-$ lead to a different degree of doping and this phenomenon is at the base of the operation of the sensor.

Similarly to what was written for the chloride ion, the following reactions can also be exploited for the development of sensors for ions I$^-$ and Br$^-$:

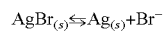

Manufacturing Examples

PEDOT Track Manufacturing: PSS.

The PEDOT:PSS track on which the nanoparticles of Ag/AgCl will be electrosynthesized is deposited on a suitable substrate (glass, plastic, etc.) through an appropriate solution deposition technique (including, for example, spin coating, doctor blade, inject printing). Metal manifolds (for example of Ag or Au) are placed at the ends of the PEDOT:PSS track to facilitate electrical contact with the reading instruments. A small portion of PEDOT:PSS below the metal collectors is covered with an inert material to the analyte and to the matrix to be analyzed, which physically supports the conductive or semi-conductive tracks without affecting the electrical properties of the PEDOT:PSS and guarantees an area of constant interaction between conductive polymer and sample.

FIG. 2 shows a diagram of the transistor. This device will be derivatized with Ag/AgX nanoparticles in order to make it sensitive to the concentration of ions X$^-$.

Electrosynthesis of the nano particles of Ag/AgX.

The PEDOT:PSS track is immersed in a solution containing Ag$^+$ and is polarized with a cathodic potential, which induces the precipitation of the Ag nanoparticles on the surface of the conducting polymer. To induce the formation of AgX, the device is polarized to an anodic potential, while it is immersed in a solution containing X$^-$ ions. The sensor will be sensitive to the X$^-$ ion.

FIG. 3 shows the characterization with an electronic scanning microscope of the surface of the polymer with Ag/AgCl particles which clearly show the formation of nanoparticles. The EDX analysis shows the presence of both chlorine and silver in the sample, confirming the formation of Ag/AgCl nanoparticles. The SEM EDX characterization clearly shows the preparation of the new composite material.

Response of the Chloride Sensitive Sensor.

The chloride ion concentration is determined by placing the sensor in contact with the liquid sample to be analyzed and applying a potential ($-1.0$ V<V<$1.0$ V) between source and drain, while the current flowing to the two terminals is measured.

FIG. 4 shows the experimental apparatus used for this kind of measurements. The addition of Cl$^-$ ions in the solution leads to a reduction of the current, the value of which appears to be directly proportional to the logarithm of the concentration of chloride ions in the solution.

FIG. 5 shows the trend of the recorded current while the sensor operates in a solution of $KNO_3$ 0.1 M and FIG. 6 shows the relative calibration curve.

Since many possible applications concern sweat analysis, the sensor response was also evaluated in a solution that simulates human sweat, which was prepared according to ISO 105-E04-2008E but without the necessary contribution of $Cl^-$ so that the analyte concentration can be varied during calibration.

Figure 7:
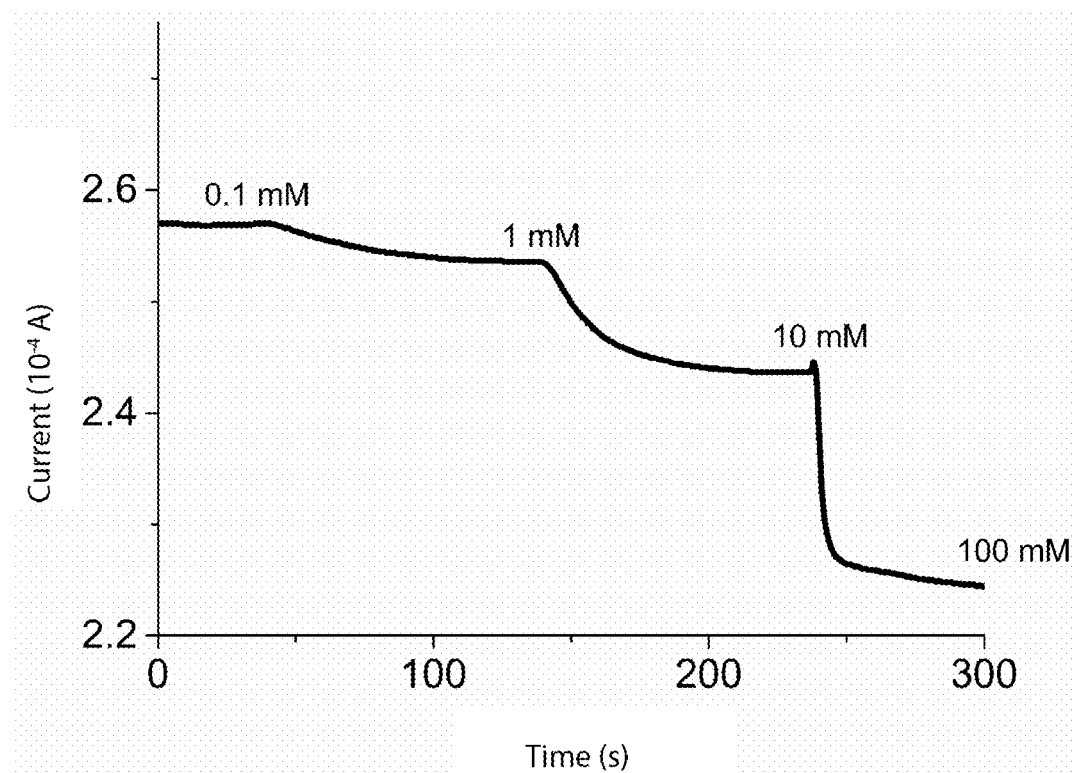
FIG. 7 shows a response of a sensor according to the invention at various concentrations of $Cl^-$ registered in a solution that simulates the artificial sweat in accordance with ISO 105-E04-2008E, from which the ion $Cl^-$ has been eliminated.

FIG. 7 shows the sensor response in these conditions. The experiments carried out clearly show that the device prepared according to the invention can be used for determining the concentration of chloride ions in various samples of interest.

Development of Sensors with Ag/AgBr Nanoparticles for the Detection of $Br^-$.

Figure 8:
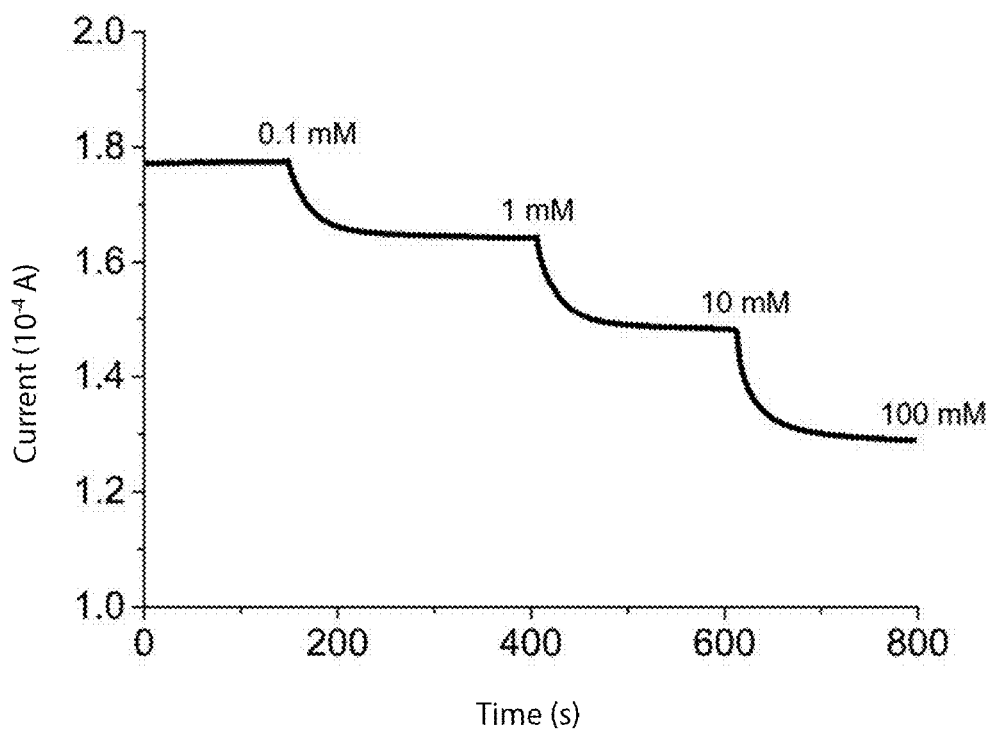
FIG. 8 shows a response of a sensor according to the invention, developed in the variant with nanoparticles of Ag/AgBr, at various concentration of $Br^-$ in $KNO_3$ 0.1 M solution. The current decreases proportionally to the concentration of added bromide in the solution.

The determination of the concentration of bromide ion is carried out by placing the sensor in contact with the liquid sample to be analyzed and applying a potential ($-1.0$ V<V<1.0 V) between source and drain, while the current flowing to the two terminals is measured. FIG. 4 shows the experimental apparatus used for this kind of measurements. The addition of $Br^-$ ions to the solution leads to a reduction of the current, the value of which appears to be directly proportional to the logarithm of the concentration of bromide ions in the solution (FIG. 8).

Sensors with Nano Particles of Ag/AgI for the Detection of $I^-$.

Figure 9:
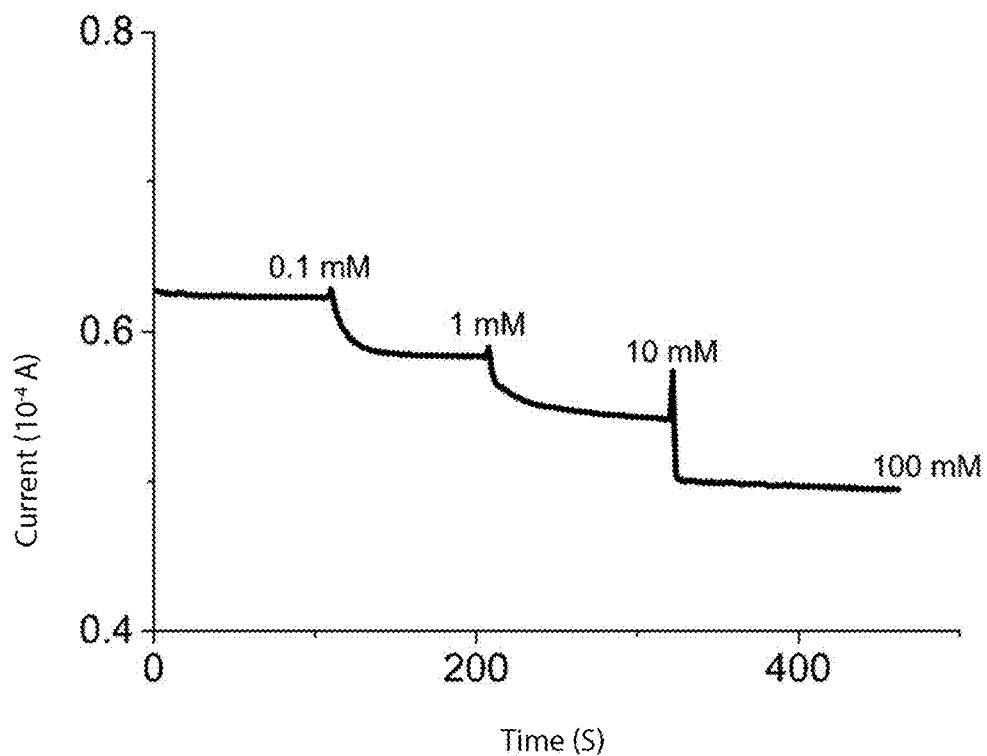
FIG. 9 shows a response of a sensor according to the invention, developed in the variant with nanoparticles of Ag/AgI, at various concentration of $I^-$ in $KNO_3$ 0.1 M solution. The current decreases proportionally to the concentration of the iodide added in the solution.

The determination of the iodide ion concentration is carried out by placing the sensor in contact with the liquid sample to be analyzed and applying a potential ($-1.0$ V<V<1.0 V) between source and drain, while the current flowing to the two terminals is measured. FIG. 4 shows the experimental apparatus used for this kind of measurements. The addition of ions $I^-$ to the solution leads to the reduction of the current, whose value results to be directly proportional to the logarithm of the concentration of iodide ions in the solution (FIG. 9).

Sensors with Nano Particles of $Ag/Ag_2S$ for the Detection of $S^{2-}$.

Figure 10:
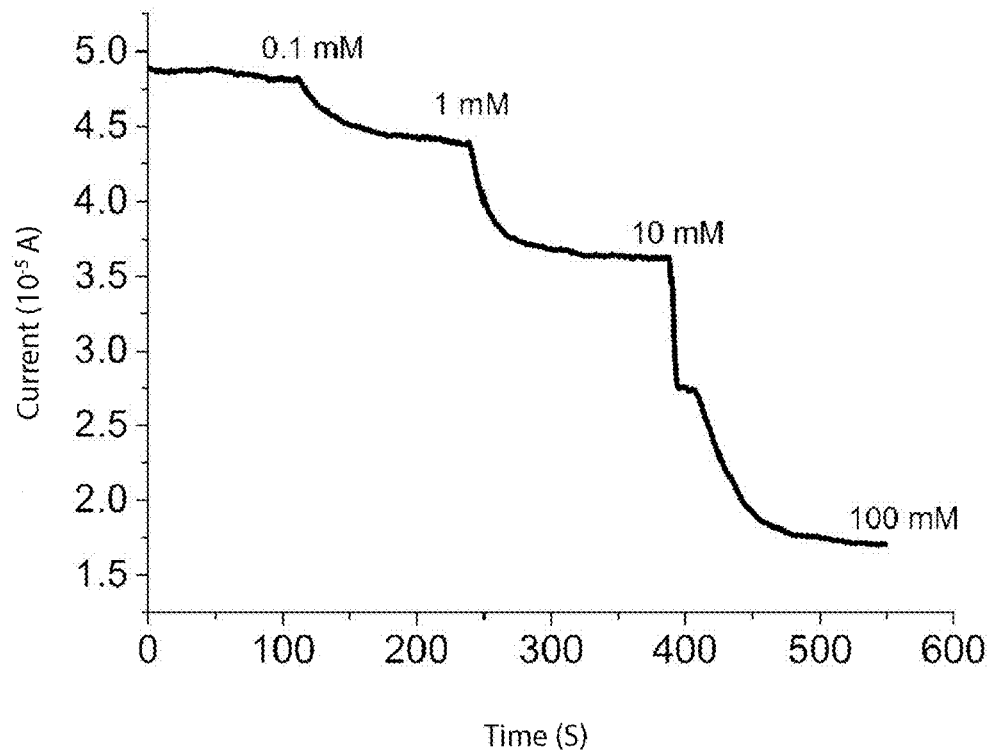
FIG. 10 shows a response of a sensor according to the invention, developed in the variant of nanoparticles of $Ag/Ag_2S$, at various concentrations of $S^{2-}$ in $KNO_3$ 0.1 M solution. The current decreases proportionally to the concentration of the sulphide added in the solution.

The determination of the concentration of the sulfide ion is carried out by placing the sensor in contact with the liquid sample to be analyzed and applying a potential ($-1.0$ V<V<1.0 V) between source and drain, while the current flowing to the two terminals is measured. FIG. 4 shows the experimental apparatus used for this kind of measurements. The addition of $S^{2-}$ ions to the solution leads to the reduction of the current, whose value results to be directly proportional to the logarithm of the concentration of sulfide ions in the solution (FIG. 10).

The experiments carried out with $I^-$, $Br^-$ and $S^{-2}$ show clearly that the procedure used for the production of the chloride ion sensor can be extended to the manufacture of sensors for the detection of anions, which form insoluble salts with $Ag^+$ ions.

Sweat Analysis System

Figure 11:
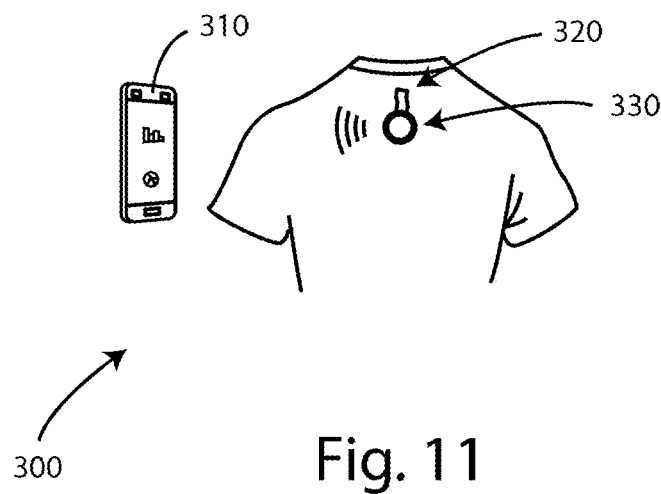
FIG. 11 shows a basic scheme of a chloride ion sensor according to the invention applied to online sweat analysis.

Referring to FIG. 11, according to the invention, a system 300 consisting of the transistor according to the invention is integrated directly into a fabric or in the form of a textile thread or fabricated on a thin and flexible support, which can be attached to the fabric or a support that keeps it in contact with the skin.

The transistor 320 can be integrated with an electronic reading circuit 330 of the output signal and wireless data communication to a mobile device, PC or smartphone 310. In this way, the result of the sweat analysis can be displayed on the device screen.

Similar systems can be produced for other electrolytes analyses, whose results can be controlled remotely.

Novelty with Respect to the Prior Art

The invention has some substantial peculiarities with respect to the prior art, which can be summarized as follows.

The device according to the invention allows to overcome some technical limits linked to traditional chemical sensors, which exploit an electrochemical transduction. Firstly, it is not necessary to use traditional electrochemical instrumentation for signal acquisition, such as a potentiostat. As a result, the electrical signal can be recorded with a simple and low-cost reading electronics. Moreover, the device does not require the use of a reference electrode, which is a component of all electrochemical sensors both potentiometric and amperometric and is relatively expensive and difficult to miniaturize. In addition, the power supply potentials and the energy absorbed by the sensor are very low ($-1.0$ V<V<1.0 V) compared to those of the devices currently used. Finally, the developed material is light and elastic and it can be easily deposited on thin and/or flexible substrates of different nature (plastic or textile substrate). All these features make this device more suitable for making portable and/or wearable sensors than traditional electrochemical sensors.

Recently, several articles have been published, in which organic-based electrochemical transistors are used as chemical sensors. The invention herein described has advantages also with respect to this type of device, since the gate electrode is integrated into the channel through the deposition on the PEDOT:PSS of nanoparticles of AgX (X=Cl, Br or I). In this way the introduction of a gate electrode consisting of a relatively expensive metal is avoided and at the same time the reading electronics will be simplified since it is necessary to apply only one potential and to register only one current instead of two.

Varying the nature of the nanoparticles deposited on the PEDOT:PSS it is possible to realize sensitive and selective chemical sensors towards anions of different nature. For example, the deposition of Ag/AgBr nanoparticles makes the device sensitive to bromide ions or, in case $Ag_2S$ deposits, the OECT is sensitive to sulfides.

Advantages of the Invention

The device according to the invention has many advantages, including:
First example of OECT in which the gate is integrated directly into the conducting polymer;
First example of PEDOT composite material: PSS_AgCl NPs;
The device so constructed is capable of operating without the need for a gate electrode;
Sensitivity to chlorides (or halides) in a range of concentrations useful for various real applications;
Device capable of operating at low voltage (<1 V), low power consumption, portable;
The active film is now also available with minimum thicknesses (<1 μm), which makes the device conformable, flexible and easily miniaturizable. The active film can be deposited on any substrate (plastic, glass, textile);
Low-cost, disposable, biocompatible, low-cost and "green" manufacturing process.

In summary, in the analysis of chlorides the proposed device, compared to those available on the market, is: at a lower cost (both the sensor and the electronics), it is miniaturizable and allows online analysis. Furthermore, the device can be produced on flexible substrates and textile support.

Immediate field of application of the device (containing Ag/AgCl nanoparticles) is the determination of the chloride ion in environmental matrices (water and soil) and in the sweat.

The invention can be conveniently used in several fields, including water analysis, environmental analysis, medical-diagnostic sector, chloride analysis in water and soil, chloride analysis in sweat (cystic fibrosis) and in other biological fluids.

For example, the following specific applications can be listed:
- device with AgCl NPs: Chloride analysis, in water or in environment matrices (soil);
- device with AgCl NPs: Chloride analysis in the sweat, important in the diagnosis of cystic fibrosis, and in other biofluids;
- device with AgCl NPs: Chloride analysis for corrosion processes;
- analysis of other anions, varying the nature of the deposited nanoparticles:
  AgBr: bromide analysis,
  AgI: iodide analysis;
- portable and wearable devices (realization of the device on fabric) and disposable;
- determination of the degree of hydration of the human body by analyzing the content of salts in the sweat, or for the diagnosis of cystic fibrosis.

BIBLIOGRAPHY

OECT with gate, source and drain electrodes in PEDOT: PSS deposited on glass or textile substrate:
A simple all-PEDOT:PSS electrochemical transistor for ascorbic acid sensing, Gualandi, I, Marzocchi, M., Scavetta, E, Calienni, M., Bonfiglio, A., Fraboni, B, Journal of Material Chemistry B, (2015) Volume 3, Issue 3, 6753-6762.
Textile Organic Electrochemical Transistors as a Platform for Wearable Biosensors, I. Gualandi, M. Marzocchi, A. Achilli, D. Cavedale, A. Bonfiglio & B. Fraboni, Scientific Reports 33637 (2016)
PEDOT Composite Material: PSS-Metal (nanoparticles or nanowires): Microchim Acta (2016) 183: 1235-1241 Electrochemical synthesis of poly (3,4-ethylenedioxythiophene) doped with gold nanoparticles, and its application to nitrite sensing
Composite Material PEDOT_Ag (nanoparticles or nanowires): Investigation of Ag-poly (3,4-ethylenedioxythiophene): polystyrene sulfonate nanocomposite films prepared by a one-step aqueous method Journal of Applied Physics 109, 124902 (2011); High-performance flexible transparent electrode films based on silver nanowire-PEDOT:PSS hybridgels, RSC Adv., 2016, 6, 64428-64433; One-Step Synthesis of Polymer-Stabilized Ag Particles on PEDOT: Effects of Stabilizer and Electrochemical Method on Formation of Ag Particle Macromolecular Research, Vol. 18, No. 11, pp. 1070-1075 (2010); Hybrid PEDOT-Metal Nanoparticles—New Substitutes for PEDOT:PSS in Electrochromic Layers—Towards Improved Performance Eur. J. Inorg. Chem. 2012, 5360-5370
Composite polymer-Ag (or AgCl NPs): Room temperature synthesis of Ag/polypyrrole core-shell nanoparticles and hollow composite capsules Synthetic Metals 160 (2010) 2121-2127; Easy Preparation and Enhanced Capacitance of the Ag-PEDOT:PSS/Polyaniline Nanofiber Network for Supercapacitors Electrochemical Acta 213 (2016) 680-690
OECT with gate of Ag|AgCl (not integrated in PEDOT): New one-pot poly (3,4 ethylenedioxythiophene): poly (tetrahydrofuran) memory material for easy fabrication of memory organic electrochemical transistors APL Mater. 3, 014903 (2015); Effect of the gate electrode on the response of organic electrochemical Transistors, Appl. Phys. Lett. 97, 123304 2010;
OECT-based ISEs: Ion-Sensitive Properties of Organic Electrochemical Transistors, Applied Materials and Interfaces VOL. 2•NO. 6•1637-1641•2010
OECT for the determination of NaCl in water: A single cotton fiber organic electrochemical transistor for liquid electrolyte saline sensing Giuseppe Tarabella, Marco Villani, Davide Calestani, Roberto Mosca, Salvatore Iannotta, Andrea Zappettini and Nicola Coppedé J. Mater. Chem., 2012, 22, 23830 (GATE: WIRE Ag)

In the foregoing the preferred embodiments have been described and variants of the present invention have been suggested, but it is to be understood that those skilled in the art will be able to make modifications and changes without thereby abandoning the relative scope of protection, as defined by the attached claims.

The invention claimed is:

1. An electrochemical organic transistor for detecting a selected electrolyte in the group comprising $Cl^-$, $Br^-$, $I^-$, and $S^{2-}$, the transistor comprising a source electrode and a drain electrode connected by a channel having a surface constituted by a conductive polymer to be put, in use, in contact with said electrolyte, wherein nanoparticles of Ag covered by silver halide AgX or silver sulfide $Ag_2S$ are present on at least a portion of said surface, wherein X=Cl, Br, or I, and wherein the nanoparticles of Ag act as a gate electrode.

2. The transistor according to claim 1, wherein said conductive polymer is polypyrrole, polyalanine or PEDOT: PSS.

3. The transistor according to claim 1, wherein an amount of silver halide on the surface of the conductive polymer is in the range of $1\times10^{-8}$ mol/cm$^2$ and $1\times10^{-6}$ mol/cm$^2$, wherein a number of deposited nanoparticles between 1 and 100 particles per μm$^2$.

4. The transistor according to claim 1, wherein said channel has the form of a wire, and said conductive polymer covers said wire, the source and drain electrodes being placed at opposite ends of the wire.

5. The transistor according to claim 4, wherein said wire is in a textile material selected from the group consisting of artificially extruded wool, silk, cotton, nylon, wire and textile fiber.

6. An analysis system comprising:
a transistor according to claim 4;
a transistor currents reading electronics configured to:
acquire concentration data of an electrolyte by said transistor, and
communicate on a wireless network to transfer said concentration data; and
a mobile device with a logic processor on which a computer program is installed, wherein, when executed by the logic processor, the computer program is configured to acquire said concentration data from said electronics through said wireless network.

7. The system according to claim 6, further comprising a fastener configured to attach said transistor to an analysis surface containing an electrolyte to be detected.

8. The system according to claim 7, wherein said fastener is configured to removably attach said transistor to said analysis surface.

9. The transistor according to claim 2, wherein an amount of silver halide on the surface of the conductive polymer is in the range of $1 \times 10^{-8}$ mol/cm$^2$ and $1 \times 10^{-6}$ mol/cm$^2$, wherein a number of deposited nanoparticles between 1 and 100 particles per µm$^2$.

10. The transistor according to claim 2, wherein said channel has the form of a wire, and said conductive polymer covers said wire, the source and drain electrodes being placed at opposite ends of the wire.

11. The transistor according to claim 3, wherein said channel has the form of a wire, and said conductive polymer covers said wire, the source and drain electrodes being placed at opposite ends of the wire.

12. An analysis system comprising:
a transistor according to claim 5;
a transistor currents reading electronics configured to:
  acquire concentration data of an electrolyte by said transistor, and
  communicate on a wireless network to transfer said concentration data; and
a mobile device with a logic processor on which a computer program is installed, is the computer program configured to acquire said concentration data from said electronics through said wireless network.

13. The system according to claim 12, further comprising a fastener configured to attach said transistor to an analysis surface containing an electrolyte to be detected.

14. The system according to claim 13, wherein said fastener is configured to removably attach said transistor to said analysis surface.

* * * * *